United States Patent [19]
Dybala et al.

[11] 3,918,874
[45] Nov. 11, 1975

[54] APPARATUS FOR MULTI-ORIFICE EXTRUSION

[75] Inventors: Ambrose B. Dybala, Toledo; David Jesiolowski, Maumee; Casimir W. Nowicki, Toledo; Thomas A. Shapler, Bowling Green, all of Ohio

[73] Assignee: Owens-Illinois, Inc., Toledo, Ohio

[22] Filed: Mar. 4, 1974

[21] Appl. No.: 447,537

[52] U.S. Cl. .... 425/381; 425/382 R; 425/DIG. 206; 425/DIG. 211
[51] Int. Cl.² .............. B29D 23/04; B29D 23/03
[58] Field of Search ............ 425/326 B, 381, 382 R, 425/465, DIG. 206, Dig. 211; 264/167

[56] References Cited
UNITED STATES PATENTS

| | | | |
|---|---|---|---|
| 2,674,006 | 4/1954 | Bailey et al. | 425/326 B |
| 3,564,653 | 2/1971 | Sparks et al. | 425/381 X |
| 3,767,345 | 10/1973 | Doughty et al. | 425/326 B |

FOREIGN PATENTS OR APPLICATIONS

| | | | |
|---|---|---|---|
| 249,350 | 9/1966 | Austria | 425/DIG. 206 |
| 98,400 | 4/1964 | Denmark | 425/DIG. 206 |
| 1,277,345 | 10/1961 | France | 425/DIG. 206 |

*Primary Examiner*—R. Spencer Annear
*Attorney, Agent, or Firm*—Philip M. Rice; E. J. Holler

[57] ABSTRACT

An apparatus for the simultaneous extrusion of a plurality of tubular parisons, each extruded through annular, variably dimensionable extrusion orifices aligned in a single plane and receiving plasticized material from a melt system, with the walls of each tubular parison being identically varied by simultaneous and identical variations of each annular orifice dimension. Each orifice is defined by relatively axially displaceable mandrel and bushing elements. A beam elongated in the single plane of the extrusion orifices and outside of the melt system supports the displaceable element of each orifice and is restrained for axial movement in the orifice plane by the displaceable orifice-defining elements. Axially reciprocating the beam toward and away from the orifices varies the dimension of each extrusion orifice simultaneously and identically.

20 Claims, 9 Drawing Figures

APPARATUS FOR MULTI-ORIFICE EXTRUSION

BACKGROUND OF THE INVENTION

In the manufacture of containers for the retention of liquids, there are various techniques known to obtain a finished container from a plasticized material. One well-known technique includes the extrusion of a tubular parison from an orifice and subsequent blow molding of the parison into the shape of the final container. One variation in this technique is where the tubular parison is initially blown into a pre-form having a shape intermediate the parison and the final container, with multi-axial stretching of the blown pre-form at orientation temperature for enhanced physical strength of the finished container. After stretch orientation, the blown pre-form is then blown into the shape of the final container.

In those methods of forming a finished container which include a blow molding operation, it is quite difficult, if not virtually impossible, to mass produce a finished container of uniform wall thickness. This problem occurs because the blowing operation stretches the plasticized material and there are different amounts of stretching for different contours throughout the finished container.

For example, where the body of a bottle is wider than the neck, there is more stretching of the plasticized material in the formation of the body than in the formation of the neck with many variations in the amount of stretching along the shoulder. Furthermore, variations in the amount of stretching may occur within the body itself if the body has any contours. Finally, in the formation of the bottom of the bottle there are variations in the amount of stretching along the heel.

It is known to compensate for the variations in stretching during the formation of a blown plastic container by providing, initially, a tubular parison having non-uniform wall thickness. The wall thickness of the parison would, obviously, be greater in those areas where greater stretching is to occur during the blowing operation and, correspondingly thinner for those portions of the wall which are to have lesser amounts of stretching during the blowing operation.

However, prior to the present invention, there was no satisfactory apparatus for simultaneously providing a plurality of parisons having identical variations in wall thickness.

BRIEF DESCRIPTION OF THE PRESENT INVENTION

The present invention now provides an apparatus for simultaneously extruding a plurality of tubular parisons having identical variations in the wall thickness of each parison so that each final blown container has a wall of equal and uniform thickness.

The apparatus of the present invention includes a plurality of extrusion orifices aligned in a single plane, each having relatively axially movable mandrel and bushing elements defining an orifice therebetween. Means are provided for simultaneously and identically axially displacing the orifice-defining elements to identically and simultaneously vary each orifice dimension. The displacing means includes a beam, elongated in the plane of the orifices, which supports the displaceable element of each orifice, and actuator means for moving the beam in the plane of the axes of the orifices.

Additionally, means are provided for restraining the beam for displacement only in said plane. Specifically the beam is rigidly secured to the displaceable orifice-defining elements which, in turn, are restrained against lateral movement. No attempt is made to rigidly guide the beam. The orifice elements are guided and restrained to only axial movement. The beam being rigid with the elements is guided by them.

The actuator means includes, in one embodiment a lifting means, such as a hydraulic cylinder, and means to distribute the lifting force equally to both ends of the beam including a torsion shaft spaced apart from and parallel to the beam. The shaft has radial arms mounted at its opposite ends and each radial arm terminates in a ball which is mounted in a corresponding aligned socket at opposite ends of the beam.

In another embodiment the lifting means includes a double ended hydraulic cylinder and two elevator units, one at each end of the beam. Each elevator unit receives a shaft connected to the hydraulic cylinder, each shaft having two opposed parallel cam surfaces. A roller-follower contacting each cam surface translates reciprocating shaft movement into movement of the elevator unit and beam axially of the orifice.

OBJECTS

It is, therefore, an important object of the present invention to simultaneously provide a plurality of extruded tubular parisons having identical variations in wall thickness.

Another important object of the present invention is the provision of an apparatus for simultaneously extruding a plurality of tubular parisons having variable wall thickness with the variation in wall thickness being identical among the extrusions.

A further important object of this invention is the provision of an apparatus for simultaneously extruding a plurality of identical tubular parisons, the apparatus including a plurality of extrusion orifices aligned in a single plane to receive plasticized material from a melt system, the orifices having relatively axially displaceable mandrel and bushing elements to define the orifice therebetween, and means external to the melt system for simultaneously and identically axially displacing the orifice defining elements to vary the orifice dimension.

Yet another important object of the present invention is the provision of an apparatus for simultaneously extruding a plurality of identical tubular parisons including a plurality of extrusion orifices aligned in a single plane to receive plasticized material from a melt system and having relatively axially displaceable mandrel and bushing elements to define the orifice therebetween, a beam external to the melt system and supporting the displaceable element of each orifice, and an actuating means for axially reciprocating the beam to displace the orifice-defining elements, the beam being restrained for planar axial reciprocation by the displaceable orifice-defining elements.

Still another important object of the present invention is the provision of an apparatus for simultaneously extruding a plurality of tubular parisons having identical variations in the wall thickness, which apparatus includes a plurality of annular spaced apart extrusion orifices aligned in a single plane and receiving plasticized material from a melt system, each orifice being defined by relatively axially displaceable bushing and mandrel elements, an elongated cylindrical sleeve telescopically receiving each mandrel and restraining axially spaced apart portions of the mandrel against radial movement, and a beam elongated in the plane of the extrusion orifices and outside the melt system, the beam supporting the displaceable elements of each orifice and being restrained for axial movement perpendicular to the plane of the extrusion orifices by the displaceable orifice-defining elements.

Yet another important object of the present invention is the provision of an apparatus for simultaneously extruding a plurality of tubular parisons having identical variations in wall thickness, which apparatus includes an orifice block having a plurality of elongated bores therein aligned in a single plane and receiving plasticized material at one end of the bores from a melt system, a plurality of mandrels each secured within a sleeve, each sleeve telescopically mounted within a bore, and a plurality of orifice bushings each associated with a mandrel to define an orifice therebetween, each orifice being variably dimensioned by relative axial displacement of the mandrel and orifice bushing, and a beam external to the bores and the melt system for supporting each displaceable orifice defining element and for moving each orifice defining element simultaneously, the beam being elongated in the plane of said bores and being restrained and supported by each relatively displaceable orifice defining element for planar axial displacement.

IN THE DRAWINGS

In the drawings, wherein like reference numerals identify corresponding elements.

AS SHOWN IN THE DRAWINGS

In the drawings, reference numeral 10 refers generally to the apparatus of the present invention for simultaneously extruding a plurality of identical tubular parisons 11. The apparatus includes a melt system comprising an orifice block 12 having a plurality of internal, axially elongated bores 13 aligned in a single plane and each connected through conduits 14 in the block to exit ports 15 also in the orifice block. Each exit port or outlet 15 is connected to a common source of plasticized material which is fed through the port and conduit into each bore 13 by conventional means (not illustrated) such as an extruder of either the fixed or reciprocating screw type. In lieu of a single orifice block, a plurality of orifice blocks may be provided each having one or more longitudinal bores 13 therein coupled to their respective conduits and ports and ultimately to the common source of plasticized material.

A mandrel sleeve clamp or bracket 16, which surrounds an internally threaded bushing 17, is secured to orifice block 12. A hollow rectangular frame 18 extending the full length of the orifice block 12 and providing suitable support for the apparatus, is fastened to the orifice block 12 by bolts 19 extending through the mandrel sleeve clamp 16.

The orifice block 12 carries, at its upper extremity, a plurality of orifice bushings 20 each of which is surrounded by a guide block 21. Each bushing 20 has a bore 22 therethrough which is an extension of the respective extrusion bore 13. Surmounting the upper surface of each orifice bushing 20 is a finish mold 23 having an internal threaded cavity 24 for the formation of a threaded finish on the extruded parison 11 as is well-known, see U.S. Pat. No. 3,008,192.

A mandrel 30, having snugly mandrel tip 31, is telescopically mounted within a sleeve 32 and positioned within each bore 13, 22. Each mandrel tip 31 cooperates with its corresponding orifice bushing 20 to define an orifice 33 therebetween. Means are provided for restraining the telescopically mounted mandrel against lateral and radial movement within each bore 13, 22, by snggly retaining the mandrel 30 at multiple axial locations. At a first location close to the upper end of the extrusion bore 13, the mandrel 30 is snugly retained by the narrowed neck of the mandrel sleeve 32. At a second axial location, the bottom of the mandrel is inserted within a bushing 34 which, in turn, is inside the sleeve, and the sleeve is threaded within bushing 17. This multiple location axial retention prevents lateral and radial movement of the mandrel. The mandrel and sleeve are restrained against rotational movement relative to the bore 13 by frictional engagement between the sleeve and a screw 35 threaded through suitable aligned holes in clamp 16 and bushing 17.

As plasticized material is forced along the melt system through the port 15, conduit 14 and along the bore 13 on the outside of the mandrel sleeve 32, the plasticized material under pressure is extruded through the orifice 33 to form a hollow parison 11 with the finish formed in the finish mold 23. The thickness of the wall of the parison 11 may be varied by the relative axial displacement of the mandrel tip 31 and the orifice bushing 20 which varies the dimension of the orifice 33.

Means are provided for simultaneously and identically varying the dimension of the orifices, which are aligned in a single plane, by the simultaneous and identical axial displacement of the orifice-defining elements. Specifically, an elongated rectangular beam 40 is provided in the same plane as the aligned orifices. The beam supports the displaceable orifice-defining elements and is outside the melt system.

In the preferred embodiment the mandrel is the displaceable orifice-defining element and one end of the mandrel is rigidly connected to the beam 40. Specifically, a stop nut 41 on the threaded end 42 of the mandrel 30 rests on top of an internally threaded bushing 43 which has an annular exterior shoulder 44. Each mandrel end 42 is threaded into a bushing 43. Flanged brackets or clamps 45a and 45b are secured on top of the beam 40 and the flanges mate with the shoulder 44 of the bushing thus restraining any relative axial movement between the mandrel and the beam.

The initial axial position of each mandrel 30 within its bore 13, and hence the position of each mandrel relative to the other mandrels, may be adjusted by rotating the stop nut 41. An opening 47 is provided in the rear of the frame 18 to facilitate access to the adjustable stop nut 41.

A single actuating means is provided to displace the beam axially toward and away from the orifice block 12 for moving the mandrels 30 to vary the orifice dimension. Specifically, a hydraulic cylinder 50 serves to axially reciprocate the beam 40. Control of the cylinder 50 is provided by a linear variable differential transformer (LVDT) 51 which permits a constant comparison between the hydraulic signal to the cylinder and the actual movement of the beam. A satisfactory LVDT, manufactured by Hunkar Laboratories, Inc., of Cincinnati, Ohio, has a coil 52 mounted by a support 53 to the apparatus frame 18. A wand 54 of the LVDT 51 is coupled through an adaptor 55 to the beam 40 and the axial movement of the wand relative to coil 52 corresponds to beam and mandrel movement. The movement of the beam and hence movement of the mandrels is controlled by a preselected program.

Axial movement of the beam 40 toward the orifice block 12 may be limited by a stop 56 threaded into and extending upward from frame 18 through an aperture 57 in the bottom of beam 40. Adjustment of the stop 56 changes the upper limit of beam movement.

Axial beam movement away from the orifice block 12 is limited by the abutting contact of the bottom of beam 40 against the interior bottom of frame 18. However, this is a "fail-safe" measure and should not occur as it would correspond to a fully open orifice 33 and the parison 11 would cease to be tubular.

One important object of the present invention is for the wall thickness of the parisons to be simultaneously and identically varied which, in turn, requires the extrusion orifices to be simultaneously and identically varied. Since each mandrel is supported for common movement on beam 40, and since mandrel movement varies the extrusion orifice dimension, it is necessary to move each mandrel simultaneously and identically.

To accomplish this movement, the beam must be restrained for planar axial movement; planar in the plane of the aligned extrusion orifices and axial relative to the extrusion orifices. This planar axial movement insures that each mandrel moves simultaneously and identically.

The beam 40 is restrained for planar axial movement by rigid connections to the displaceable orifice-defining elements exterior of the melt system. In a preferred embodiment, the beam is rigidly connected to each mandrel by threading one end 42 of the mandrel into a bushing 43 secured to the beam 40. With each mandrel rigidly connected to the beam, and with each mandrel restrained against lateral and radial movement, by its sleeve 32 and bushing 34, the beam is restrained for planar axial movement.

Means are provided to distribute the lifting force on the beam 40 from the hydraulic cyliner 50 to reduce the wear on the sleeves 32, bushings 34 and 43 and threaded mandrel end 42.

Specifically, a torsion shaft 61, spaced apart from and parallel to beam 40 is journalled in a plurality of pillow blocks 62, which, in turn, are secured to the frame 18 by bolts 63. One radial arm 64 is pinned to each end of the torsion shaft 61 for rotation therewith. Each arm 64 terminates in an integral ball 65 which is retained within a socket 66 in a bushing 67 at opposite ends of the beam 40. Thus any force which tends to lift one end of beam 40 is distributed to both ends of the beam.

By supporting all mandrels on a common beam, and by restraining beam movement so that all mandrels move simultaneously in time and identically in degree, each extrusion orifice and hence the wall thickness of each extruded parison is synchronized, i.e., simultaneously and identically varied.

Figure 1:
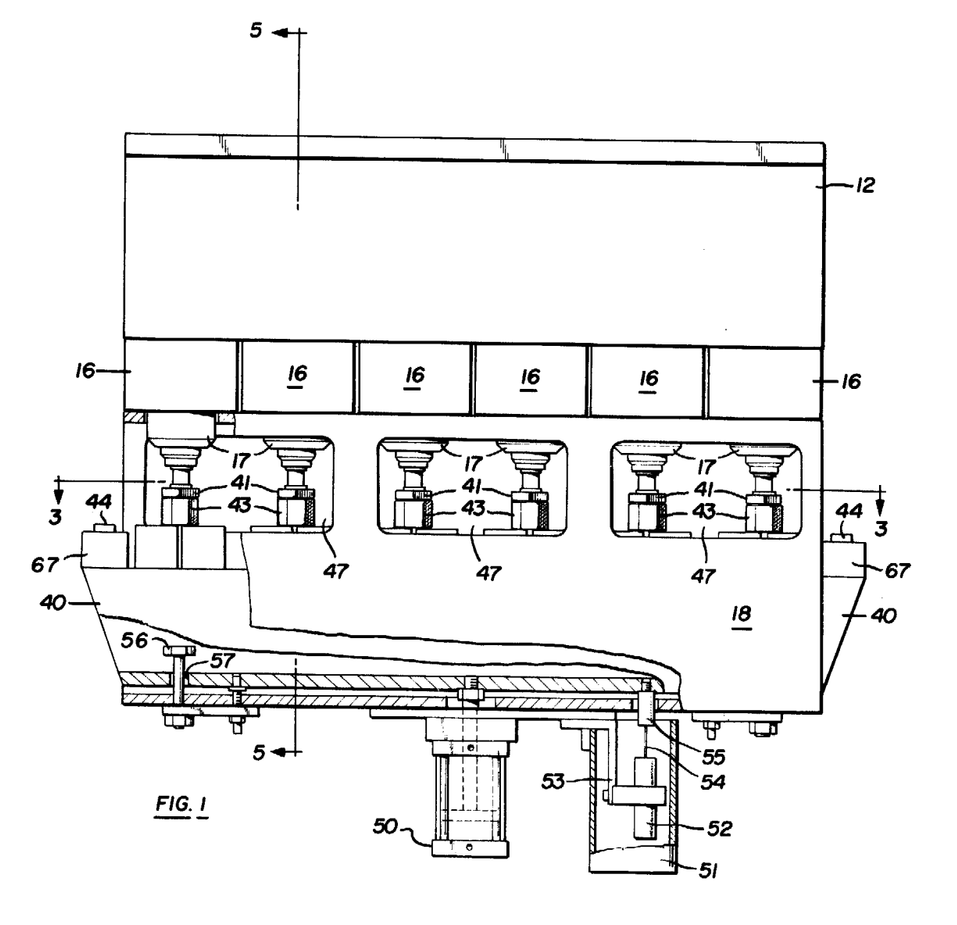
FIG. 1 is a front elevation view of the apparatus of the present invention, partly in section.
Figure 2:
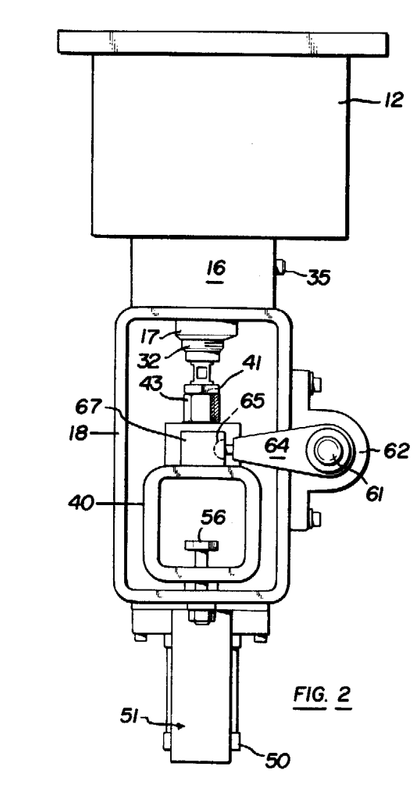
FIG. 2 is a side elevation view of the apparatus of the present invention with the beam in a position away from the orifices.
Figure 3:
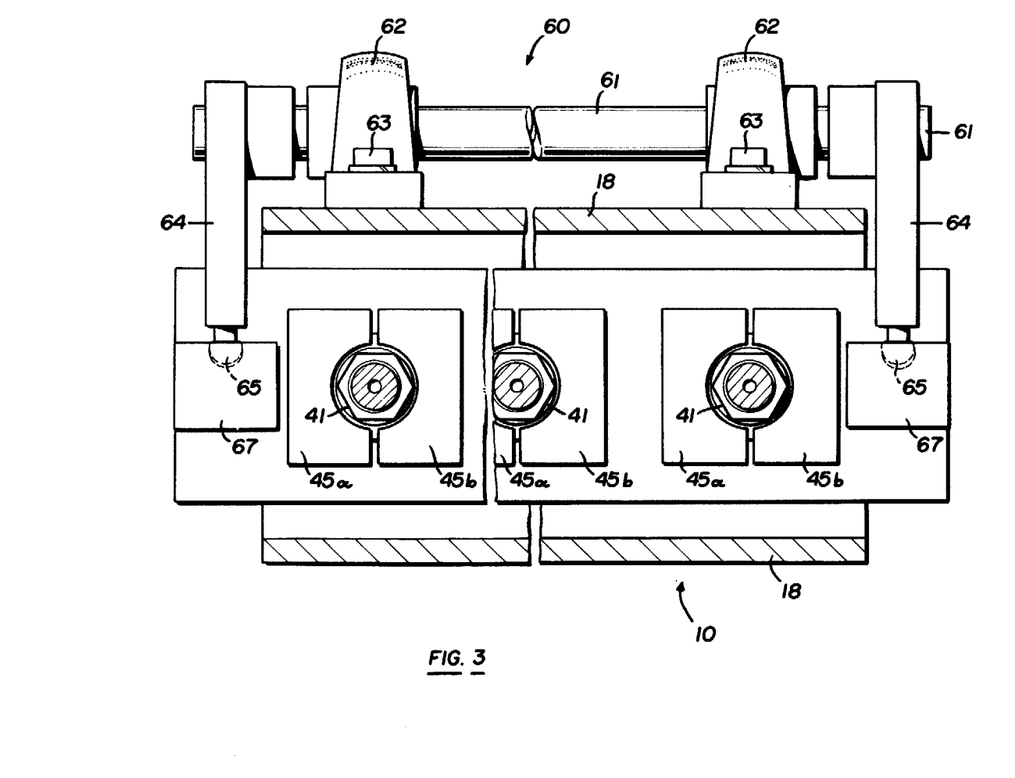
FIG. 3 is a plan view of the apparatus of the present invention as seen in the plane of arrows 3—3 of FIG. 1.
Figure 4:
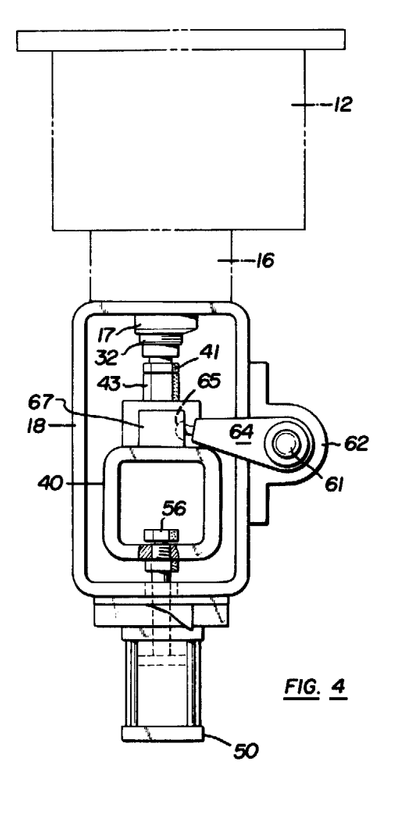
FIG. 4 is a side elevation view of the apparatus of the present invention with the beam in a position toward the orifices.
Figures 5, 6:
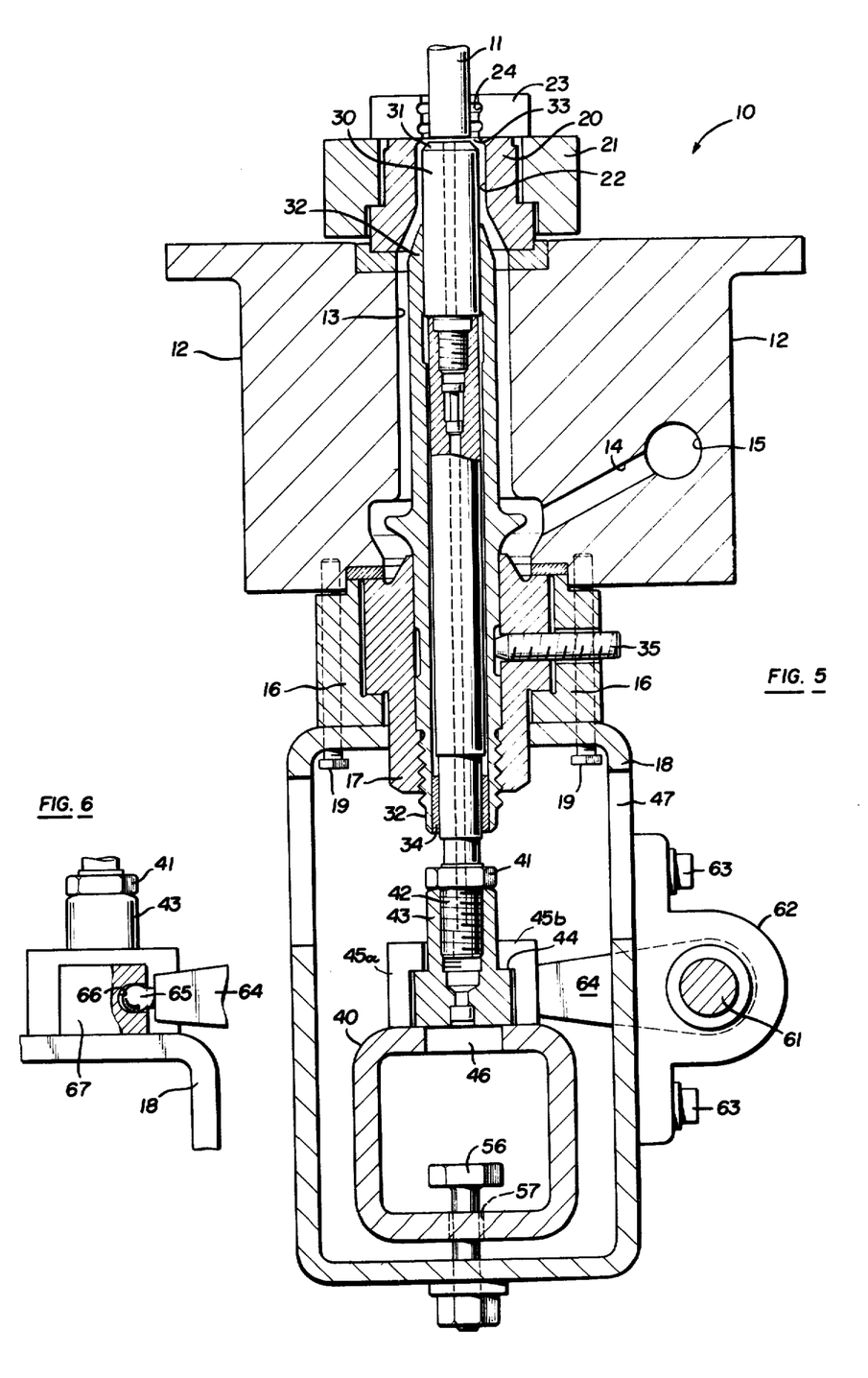
FIG. 5 is a side elevation, partly in section, of the apparatus of the present invention as seen in the plane of arrows 5—5 of FIG. 1.
FIG. 6 is an enlarged partial illustration of several of the features of the present invention.
Figure 7:
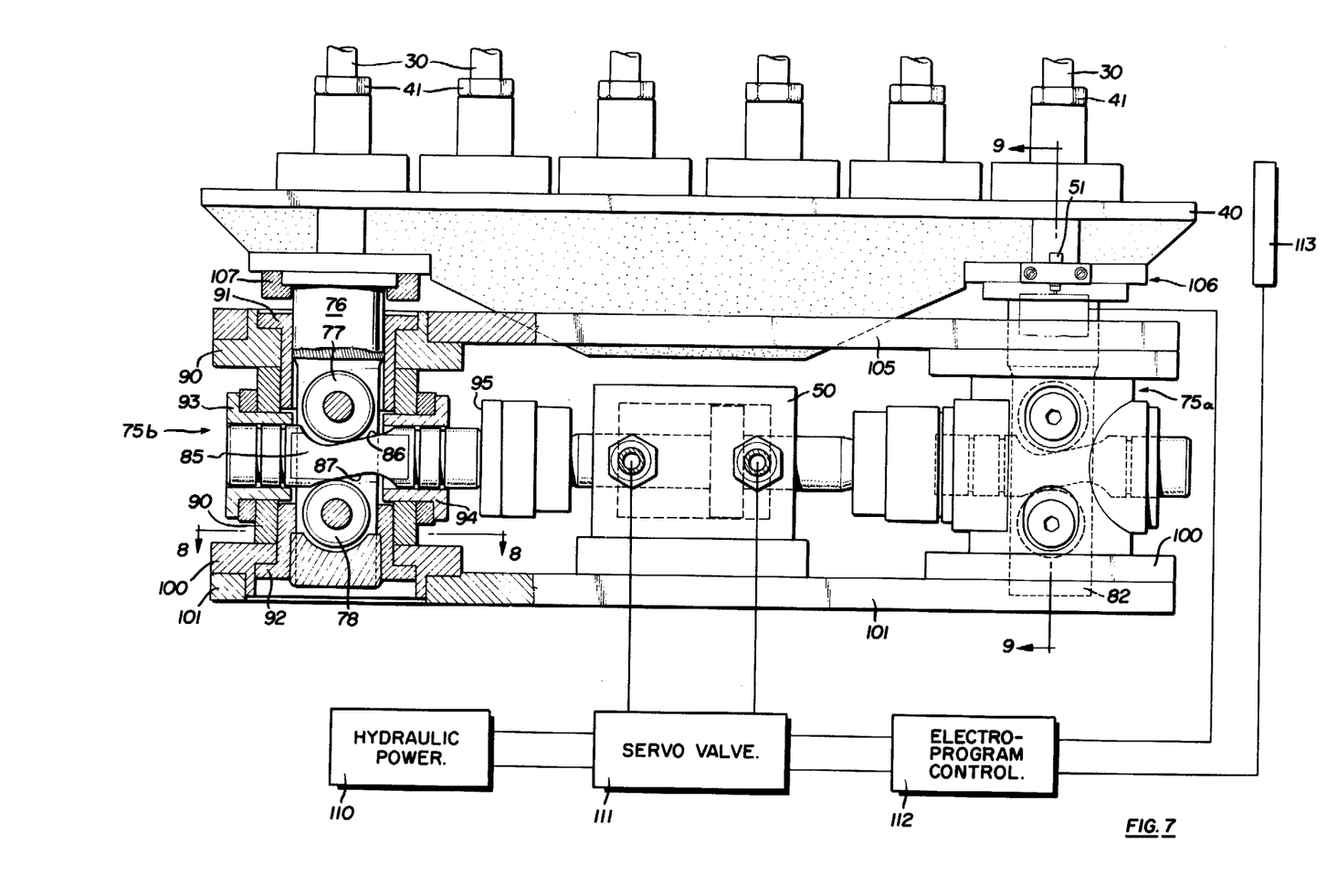
FIG. 7 is a side elevation view, partly in cross-section, of another embodiment of the lifting means of the present invention.
Figure 8:
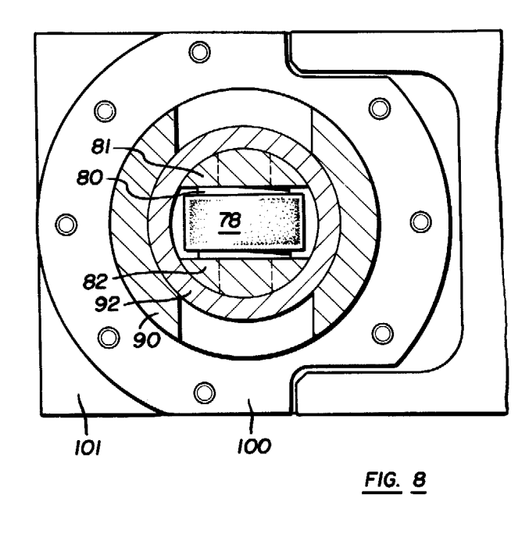
FIG. 8 is a plan view as seen in the plane of arrows 8—8 of FIG. 7.
Figure 9:
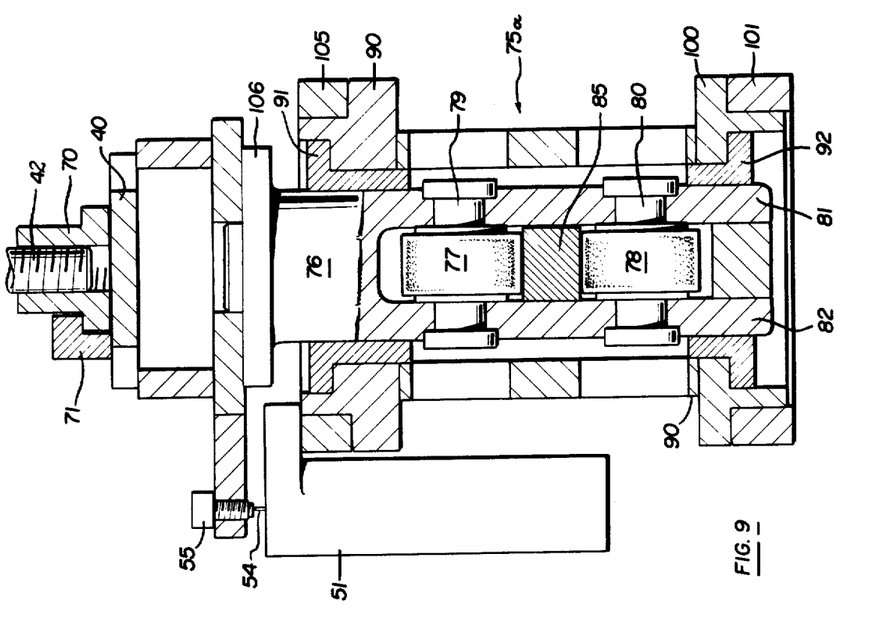
FIG. 9 is a side elevation view as seen in the plane of arrows 9—9 of FIG. 7.

DESCRIPTION OF THE EMBODIMENT OF FIGS. 7–9

The embodiment of FIGS. 7–9 illustrate a different lifting means for translating the movement of the hydraulic cylinder 50 into movement of the beam 40 axially of the orifices.

The mandrels are mounted in sleeves, as in the embodiment of FIGS. 1–6, with the axial position of each mandrel within its bore adjustable by rotating the stop nut 41. The lower end 42 of each mandrel 30 is threaded into a flanged adjusting nut 70 and each nut is secured to the beam 40 by a flanged bracket or clamp 71. This corresponds, functionally, to the bushing 43 and bracket or clamp 45a, 45b of the embodiment of FIGS. 1–6, and restrains the beam for planar axial movement.

In the embodiment of FIGS. 7–9 the hydraulic cylinder 50 is a horizontally mounted, double-ended unit which reciprocates transversely of the axis of the mandrels 30 and this movement is translated by two elevating units 75a, 75b into reciprocation of the beam axially of the orifices. The elevating units are at opposite ends of the beam 40 to reduce wear on the mandrel sleeves 32 as does the torsion shaft 61 and ball and socket arrangement illustrated in FIGS. 1–6.

Each elevating unit includes a downwardly opening yoke 76 having vertically spaced rollers 77, 78 mounted on horizontal eccentric shafts 79, 80 which in turn are journaled in the yoke legs 81, 82.

A horizontally disposed cam shaft 85, having opposed parallel upper and lower cam surfaces 86, 87, is mounted between the rollers 77, 78 of each elevating unit. Each cam shaft is simultaneously and identically reciprocated transversely of the axis of the mandrels 30 by the action of hydraulic cylinder 50. Since the rollers are on eccentric shafts, they contact and follow the parallel cam surfaces 86, 87 to translate the transverse cam shaft movement into yoke movement axially of the mandrels.

The elevating unit also includes a stationary housing 90, for yoke 76, and a plurality of bushings within the housing for guiding the movement of the yoke and the cam shaft.

More specifically, yoke 76 is guided for vertical movement in housing 90 by upper and lower bushings 91, 92. The cam shaft 85 is guided for transverse movement by outer and inner bushings 93 and 94. A stop 95 on the cam shaft abuts the end of bushing 94 to limit cam shaft movement, thus limiting beam movement, similar to the stop 56 (see FIG. 5).

The lower end of each elevating unit is held by flanged guide bushing 92 within its respective base 100. The bottom surface of each base 100 is a finished surface with keyways which engage keys on the top surface of a common base plate 101. The hydraulic cylinder is fastened to the base plate 101, and this base plate provides the main support function as does the frame 18 of FIGS. 1–6.

A tie plate 105 connects the stationary housings 90 of the two elevating units to provide rigidity and prevent distortions due to the push and pull of the hydraulic cylinder against the elevating units. One elevating unit 75a has the upper portion of its yoke 76 rigidly connected to the mandrel beam 40, as at 106. The other elevating unit 75b is clamped by ring 107 to the beam 40. This clamping is non-rigid to prevent binding of the elevating units due to dimensional mismatches or changes caused by temperature variations.

In both embodiments the LVDT 51 is connected to mandrel beam 40. Furthermore, although shown only in FIG. 7, both embodiments of the invention include a source of hydraulic power 110, a servo valve, coupling hydraulic power to the cylinder 51 and responding to a preselected program 112 for varying parison wall thickness, and a synchronizer 113 to compare the actual mandrel position, as indicated by LVDT 51, to the desired mandrel position according to the preselected program.

We claim:

1. An extrusion apparatus comprising a plurality of annular extrusion orifices aligned in a single plane and receiving plasticized material from a melt system, each orifice being defined by relatively axially displaceable mandrel and bushing elements, means for simultaneously and identically varying the dimension of each orifice by axially displacing said orifice-defining elements, said means including a laterally movable beam elongated in said single plane and outside said melt system, said beam supporting the displaceable element of each orifice, and actuating means for laterally moving the beam axially of said orifice, the entire beam being restrained for equidistant planar lateral movement by said displaceable orifice-defining elements.

2. The invention as defined in claim 1 wherein the displaceable element of each orifice is the mandrel.

3. The invention as defined in claim 1 wherein the displaceable element of each orifice is rigidly fastened within a clamp, said clamp and said beam secured together against relative axial movement.

4. The invention as defined in claim 3 wherein the displaceable element of each orifice and the clamp are relatively axially adjustable.

5. The invention as defined in claim 1, wherein said actuating means includes an hydraulic cylinder directly coupled to said beam for laterally moving the beam axially of said orifice.

6. The invention as defined in claim 1, wherein said actuating means includes an hydraulic cylinder and a cam and roller for translating movement of said cylinder into lateral beam movement axially of said orifice.

7. In an extrusion machine having a plurality of annular, spaced-apart extrusion orifices aligned in a single plane and receiving plasticized material from a melt system, each orifice being defined by relatively axially displaceable bushing and mandrel elements with said bushing element surrounding one end of the mandrel element; the improvement of means for simultaneously and identically displacing said orifice-defining elements to simultaneously and identically vary the dimension of each orifice; said displacing means including an elongated cylindrical sleeve telescopically receiving said mandrel and restraining axially spaced portions of said mandrel against radial movement, a laterally movable beam elongated in said single plane and outside said melt system, means rigidly securing said beam to the displaceable element of each orifice, actuating means for laterally reciprocating said beam relative to said orifices to identically axially displace the displaceable element of each orifice to identically vary each orifice dimension, the entire beam being guided for equilateral reciprocation in said single plane by said displaceable orifice-defining elements.

8. The invention as defined in claim 7 wherein each displaceable orifice-defining element is rigidly fastened within a restraining member, said restraining member and beam clamped together against relative axial movement.

9. The invention as defined in claim 7 wherein said restraining member is an internally threaded bushing.

10. The invention as defined in claim 7 wherein said restraining member is a flanged adjusting nut.

11. The invention as defined in claim 7 wherein said actuating means includes an hydraulic cylinder for laterally reciprocating said beam relative to said orifices.

12. The invention as defined in claim 11 wherein said actuating means further includes a cam shaft reciprocated by said cylinder and having opposed parallel cam surfaces, and a pair of roller followers, each contacting and following one of said cam surfaces, for laterally reciprocating said beam relative to said orifices.

13. In a multiple orifice machine for simultaneously extruding identical hollow tubular parisons through a plurality of bores in a first plane and through orifices associated with a first end of each bore, each orifice being defined between relatively displaceable mandrel and bushing members with each mandrel member telescopically received by a bore and secured against lateral movement relative to said bore by sleeve means, each bore receiving a flow of plasticized material at a second bore end, the improvement of a control means for synchronizing the relative displacement of the orifice-defining members of each orifice, said control means including a beam positioned exteriorly of the flow of plasticized material and elongated in said first plane, said beam supporting the displaceable member of each orifice, and actuator means for laterally moving said beam axially of said orifices to telescopically displace the orifice defining member, the beam being restrained for lateral reciprocal movement parallel to its longitudinal axis by said displaceable orifice-defining memebers and by said sleeve means.

14. The invention as defined in claim 13, wherein said sleeve means includes a hollow elongated sleeve having a narrow first end to securely retain a first axial portion of said mandrel member and a bushing snugly receiving a second axial portion of said mandrel member at the second end of said sleeve, said second end of said sleeve being restrained against axial and radial movement relative to said beam.

15. The invention as defined in claim 13 wherein one end of each displaceable orifice-defining member is threaded into a bushing attached to said beam, said bushing and beam secured together against relative axial movement by a flanged bracket.

16. The invention as defined in claim 13 wherein said actuator means includes a pair of lifting means each coupled to opposite ends of said beam, respectively, each of said lifting means including a laterally reciprocable shaft having parallel opposed cam surfaces and a roller follower contacting each cam surface for translating the lateral shaft reciprocation into beam movement axially of said orifices.

17. The invention as defined in claim 13 wherein said actuator means includes lifting means and a torsion shaft spaced apart from said beam and coupled to opposite ends thereof for uniformly transmitting the force of said lifting means to both ends of said beam.

18. The invention as defined in claim 17 wherein said torsion shaft has a radial arm mounted on opposite ends thereof to rotate therewith, each radial arm terminating in a ball entrapped within a socket operatively coupled to said beam.

19. Apparatus for simultaneously extruding a plurality of tubular parisons having identically non-uniform wall thickness comprising: orifice block means having a plurality of elongated bores therein aligned in a single plane and receiving plasticized material at one end of said bores from a melt system, a plurality of mandrels each secured within a sleeve means, each sleeve means telescopically mounted in a bore, and a plurality of orifice bushings each associated with a mandrel to define an orifice therebetween, each orifice being variably dimensioned by axial displacement of a mandrel relative to its orifice bushing; means external to said bores and said melt system for simultaneously and identically displacing each mandrel axially with respect to its corresponding orifice bushing to vary each orifice dimension simultaneously and identically, said displacing means including a beam elongated in said single plane spaced apart from said orifice block means, said beam being restrained and supported by each relatively displaceable mandrel for planar lateral displacement parallel to the axes of said elongated bores; and an actuator for axially relatively moving said beam and said orifice block means.

20. The apparatus as in claim 19 wherein said actuator moves said beam relative to said orifice block means.

* * * * *